United States Patent [19]

Kulis, Jr. et al.

[11] Patent Number: 5,413,194
[45] Date of Patent: May 9, 1995

[54] BRAKE FRICTION PAD ASSEMBLY

[75] Inventors: Stanley F. Kulis, Jr., White Post; Richard L. Carpenter, Winchester, both of Va.

[73] Assignee: Pneumo Abex Corporation, Hampton, N.H.

[21] Appl. No.: 279,555

[22] Filed: Jul. 25, 1994

[51] Int. Cl.⁶ .................. F16D 69/00; F16D 65/00
[52] U.S. Cl. .................. 188/251 A; 188/73.1
[58] Field of Search .......... 188/250 R, 251 A, 251 R, 188/251 M, 250 E, 264 G, 73.1, 73.35, 73.36, 73.37, 73.31; 106/97

[56] References Cited

U.S. PATENT DOCUMENTS

| | | | |
|---|---|---|---|
| 1,673,027 | 6/1928 | Thompson | 188/251 R |
| 1,696,821 | 12/1928 | Thompson | 188/251 R |
| 4,219,452 | 8/1980 | Littlefield | 188/251 A X |
| 4,781,275 | 11/1988 | Olsen | 188/251 A |
| 4,792,361 | 12/1988 | Double et al. | 188/251 A X |
| 5,099,962 | 3/1992 | Furusu et al. | 188/251 A X |
| 5,132,065 | 7/1992 | Christie | 264/122 |

FOREIGN PATENT DOCUMENTS

0415381  3/1991  European Pat. Off. .
1322322  6/1963  France .
2190968  12/1987  United Kingdom .

*Primary Examiner*—Robert J. Oberleitner
*Assistant Examiner*—Peter M. Poon
*Attorney, Agent, or Firm*—Thomas S. Baker, Jr.

[57] ABSTRACT

A novel brake friction pad assembly is provided with a backing plate element, and with one or more integrally joined different friction-generating pad, noise-damping pad, and backing pad elements carried by the backing plate element, such friction-generating pad, noise-damping pad, and backing pad elements being molded using specified particulate mixture molding compositions and preferred molding method steps.

25 Claims, 4 Drawing Sheets

BRAKE FRICTION PAD ASSEMBLY

This invention relates generally to brake friction pad assemblies such as are used in various automotive vehicle brake system applications including disc brake systems and drum brake systems. These systems may be utilized in automobiles, trucks, buses, off road equipment, etc. More particularly, it concerns both an improved brake friction pad assembly having an integrally-formed shim element which functions to significantly reduce brake noise generated during brake system operation, methods of making the improved brake friction pad assembly, and novel brake friction pad assembly materials having improved friction-generating heat transfer and noise damping properties.

BACKGROUND OF THE INVENTION

Designers and manufacturers of known automobile brake systems have frequently accomplished brake system operating noise reduction by incorporating various noise reduction elements or materials, often in the nature of an add-on noise insulator or shim device, into the brake system. Such noise reducers often take the form of single or multiple layers of sheet steel, of single or multiple layers of a prepreg material such as filament-reinforced cured thermosetting resin, or rubber-like elastomeric coatings, or combinations of the aforementioned, or of still other materials in an appropriate composition and configuration. Attachment of such noise reducers to the cooperating brake friction pad has typically been accomplished by a variety of mechanical means (e.g., rivets, threaded bolts, bent tabs, etc.), by the use of room-temperature stick-on adhesives, or by the high-temperature curing of thermosetting adhesives. There has been no known attempt to effectively form a noise reducer integral with a disc brake friction pad and backing plate element combination using only a friction pad material to thereby achieve an assembly reduced-noise capability without having to incorporate a separate and additional part into the assembly during manufacture.

U.S. Pat. No. 3,027,979 issued in the name of Pocock discloses a brake structure having friction material molded integrally with a backing plate element but not extruded through the backing plate to form a shim-like noise reducer element.

European Patent Application No. 90116561.3 (Publication No. 0 415 381 A3) assigned to Sumitomo also discloses a brake structure in which the assembly friction material extends into a backing plate member opening but not beyond to form an additional noise reducer element. See also the similar disclosure of Japan Patent Application No. 55-139534 also owned by Sumitomo.

United Kingdom Patent Application No. GB 2 190 968 A granted to Textas GmbH likewise teaches a disc brake friction member wherein the friction material is extruded into but not beyond carrier plate openings and thus forms no noise reducer element at the opposite face of the carrier plate.

France Patent No. 3,322,322 granted to Societe Anonyme Francaise du Ferodo also discloses a method of forming a brake friction member wherein the member friction material is pressed and extruded only into openings in the included brake assembly metallic support element. No attempt is made to thereby create an integral shim-like noise reducer member at the opposite face of the support element.

None of the cited brake system friction member teachings disclose or even suggest that an effective braking noise reduction capability can be advantageously incorporated into a brake system friction member assembly by forming a shim-like noise reducer element from the assembly friction material or from a variant of that material at the time of assembly material molding. In this manner we eliminate any subsequent need to separately form and separately attach a noise reducer or noise isolator element to the assembly to develop the desired noise reduction capability.

SUMMARY OF THE INVENTION

Our brake friction assembly invention is essentially comprised of a molded friction-generating material and a backing plate which has opposed faces, one or more openings through its thickness, and tab-like extensions or other integral attachment means for incorporating the assembly by location and support into a brake system. The molded friction-generating material in a first embodiment of the invention extends over both opposed faces of the backing plate element by being extruded through the backing plate openings to provide a unitary structure wherein the friction material at one side of the backing plate functions as a friction-generating material and the portion of the friction material at the opposite side of the backing plate functions as the assembly shim-like, noise-damper pad element because of its better vibration damping properties.

In a second and sometimes preferred embodiment of the invention a novel molded friction-generating material is superimposed on, and cure joined, to a molded noise-damper pad material which is compounded to have improved extrusion, heat transfer, and vibration damping properties in comparison to the corresponding properties of the novel friction material alone. The molded noise-damper pad material extends over both opposed faces and in the openings of the backing plate element to provide a unitary structure wherein the superimposed friction material functions as the assembly friction-generating material and the molded noise-damper pad material functions as the assembly shim-like noise reducer element.

A third embodiment of our invention incorporates a molded backing pad element into the disc brake assembly intermediate the friction-generating pad element and the noise-damper pad element. In this particular embodiment of the invention the molded backing material is cure-joined to both the superimposed molded friction material and the molded damping material, the latter of which preferably extends through the backing plate openings and over both opposed backing plate faces to provide a unitary structure wherein the molded friction material functions as the assembly friction-generating pad element and the molded damping material functions as the assembly shim-like noise-damper pad element. In this embodiment the molded backing material functions to provide thermal protection and thereby prevent thermal degradation of the molded noise-damping material in those applications where the temperature of the friction-generating pad element reaches relatively high levels during braking.

Specifics regarding the compositions of the molded friction material, the molded backing material, and the molded damping material, and particulars regarding the apparatus and process steps utilized to manufacture the brake friction assembly of this invention are provided in the drawings and detailed description which follow.

DETAILED DESCRIPTION

Although the following detailed description refers to a disc brake friction pad assembly, it should be noted that the invention applies equally to any brake friction article or pad assembly having a backing plate and a block of friction material including a drum type friction pad or article assembly.

Figure 1:
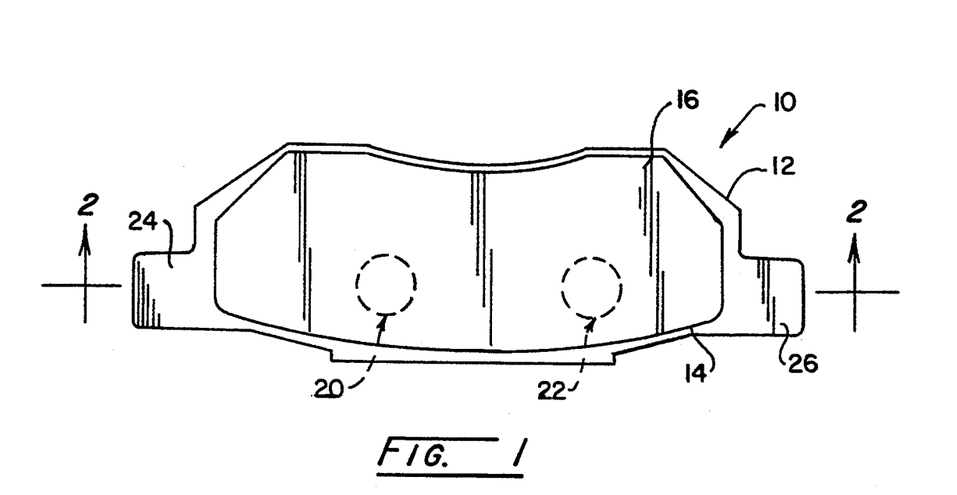
FIG. 1 is a top plan view of a first embodiment of the brake friction pad assembly of our invention.
Figure 2:
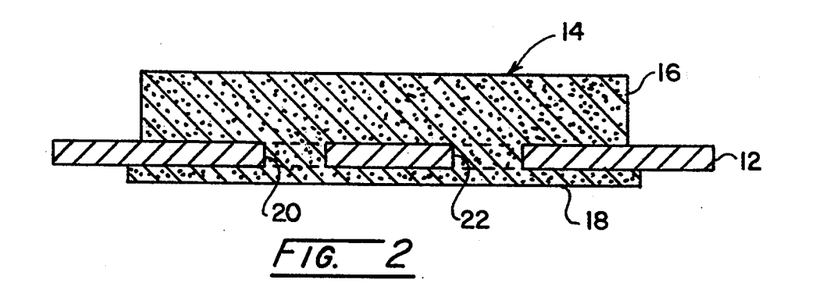
FIG. 2 is a sectioned elevational view taken along line 2—2 of FIG. 1.
Figure 3:
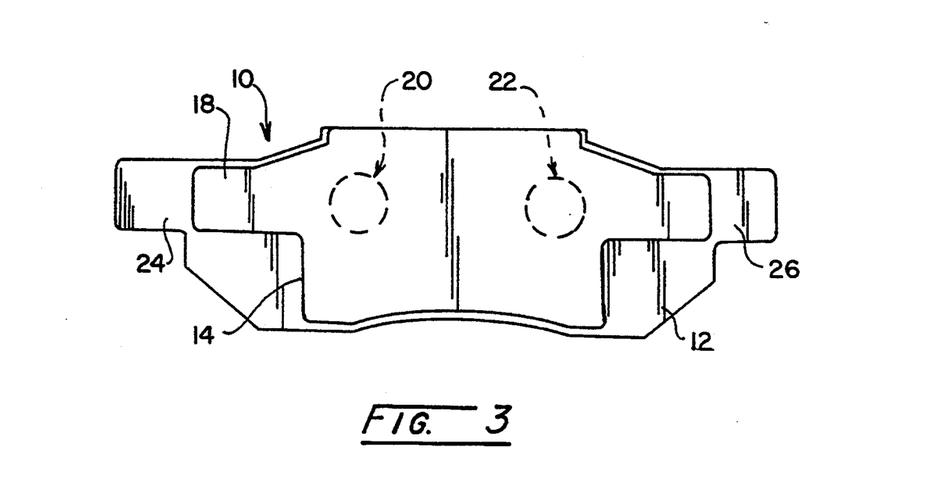
FIG. 3 is an underside plan view of the brake friction pad assembly illustrated in FIGS. 1 and 2.

FIGS. 1 through 3 illustrate a disc brake friction pad or article assembly (10) which is essentially comprised of a backing plate (12) and a molded friction material (14) integrally joined with the backing plate at the time of material molding. Molded friction material (14), in the FIGS. 1 through 3 invention embodiment is comprised of a friction-generating pad portion (16) and a shim-like noise-damper pad portion (18) which extends over parts of the opposed faces of backing plate (12). Such molded material portions are joined in an integral manner by that portion of the molded friction material contained within the extrusion openings (20 and 22) provided in backing plate element (12). Backing plate (12) also is provided with tab-like extensions (24 and 26) which function to properly support assembly (10) in its cooperating brake system. Backing plate (12) typically is fabricated of a ferrous material such as plate steel.

FIGS. 1 through 3 illustrate a brake friction pad assembly (10) having a unitary noise-damper pad portion (18). Alternatively and depending upon the magnitude of expected braking system noise-damping requirements pad portion (18) may be formed in two (or even more) segments and such pad segments may even have different planform configurations, different (unequal) planform areas, or different thicknesses. Although not necessary, it is preferable that each such noise-damper pad segment be associated with a different extrusion opening (20, 22), etc. in backing plate member (12).

Figure 4:
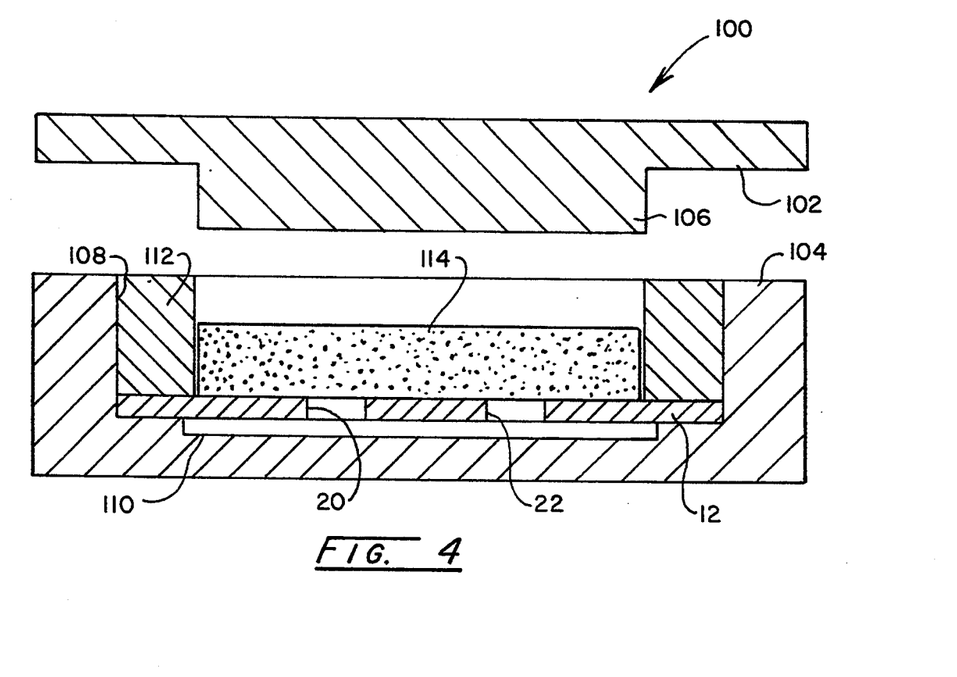
FIG. 4 is a schematic sectioned elevational view of mold apparatus illustrating the material fill condition which exists in the apparatus prior to material molding to produce the brake friction pad assembly illustrated in FIGS. 1 through 3.
Figure 5:
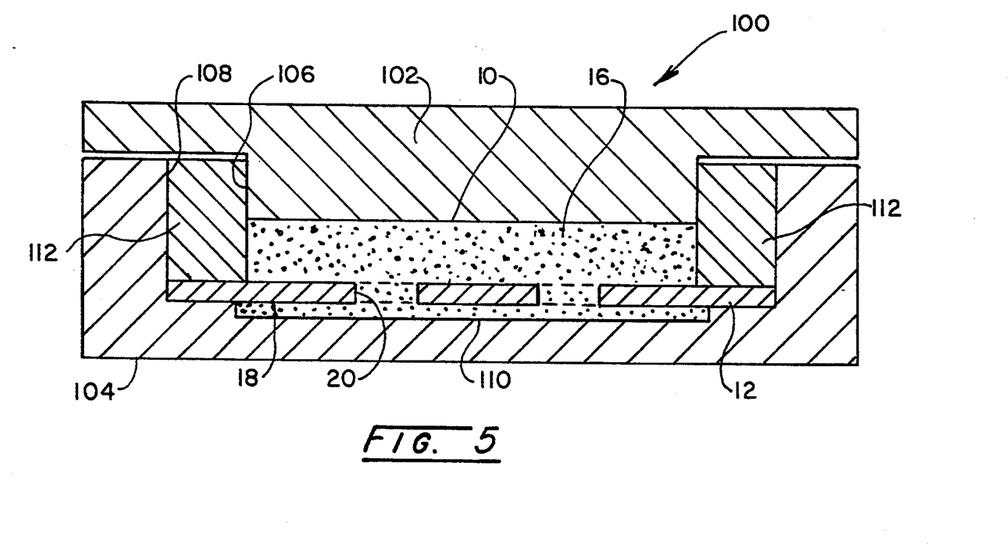
FIG. 5 is a schematic sectioned elevational view of the mold apparatus of FIG. 4 illustrating the material curing condition which exists in the apparatus following mold closure and mold halves compression.

FIGS. 4 and 5 schematically illustrate positive pressure compression molding apparatus (100) used for integrally molding assembly friction pad and noise damper pad portions (16 and 18) with the backing plate (12). Such apparatus basically consists of a mold upper half (102) and a cooperating mold lower half (104). The protruding "punch" portion (106) of mold upper half has a planform corresponding to but slightly smaller than the planform of molded friction pad portion (16). The molding cavity (108) in mold lower half (104) has a planform corresponding to but slightly larger than the planform of the backing plate (12). Molding cavity (108) also has a sub-cavity portion (110) which has a planform corresponding to the planform of shim-like noise-damper pad portion (18) of molded friction material (14) in assembly (10). Preferably sub-cavity (110) has a height of approximately 0.030 inches to 0.035 inches this being the preferred thickness of shim-like noise damper pad portion (18) in a typical domestic passenger automobile brake system disc brake friction pad assembly. In practice, the selected actual thickness of shim-like noise damper pad portion (18) in any braking system application is dictated by the system noise reduction needs and by the expected severity of system braking action.

Placed within cavity (108) after backing plate (12) has been placed at the near-bottom of cavity (108) prior to filling the mold with the desired friction material particulate mix (which may be loose particles or in a pre compacted form) is a removable mold ring-like insert (112). Insert (112) is preferably made of the same metal alloy that mold halves (102 and 104) are made of, has an exterior planform corresponding to but slightly smaller than the planform of cavity (108), and has an interior opening planform corresponding to but slightly larger than the planform of punch portion (106) of mold upper half (102). Prior to apparatus use, cavities (108 and 110) are preferably coated with a suitable mold release agent.

The upper and lower halves (102 and 104) of molding apparatus (100) preferably are pre-heated to a temperature of approximately 330 degrees Fahrenheit prior to receiving a pre-compact or pre-form (114) molded of a hereinafter described friction material particulate mixture. Alternatively, the mixture may be added as loose particles. After the material mixture pre-form (114) has been placed upon backing plate element (12) the "punch" portion (106) of upper mold half (102) is moved into contact with the pre-form (114). Compressive forces are then applied to apparatus (100) sufficient to ultimately develop an isostatic compression pressure in the range of approximately 500 pounds per square inch to approximately 6000 pounds per square inch in the molded friction material pre-form (114) after a portion of such material has been extruded through backing plate openings (20 and 22) to thereby completely fill mold subcavity (110) and integrally form shim-like noise reducer element (18) in assembly (10).

Next the interior of filled cavity (108) is vented to the atmosphere at 18 second intervals from 30 seconds to 138 seconds following initial compression and then pressure is maintained for a minimum period of 1 minute. Subsequently mold halves (102 and 104) are separated and the so-compressed and the partially cured assembly (10) is ejected from the mold using installed mold ejection pins (not shown). Thereafter the partially cured assembly (10) is transferred to a curing oven to be heat cured by raising the friction material temperature linearly to approximately 360 degrees Fahrenheit over a 2-hour period and then maintaining the so-heated assembly at the 360 degree Fahrenheit process temperature for an additional 3 hours of processing time.

In Table 1 below we provide specific formulation and formulation range details of friction material compositions that have been successfully extruded in connection with the manufacture of disc brake friction pad assembly (10). All ingredient amounts are given on a percent of total volume basis, appropriately rounded.

TABLE 1

| Ingredient | Mixture 1 Formulation | Formulation Range |
|---|---|---|
| Organic Particles | 23.3 | 20.9-23.3 |
| Binder | 31.7 | 31.7-31.9 |
| Carbonaceous Particles | 12.5 | 12.5-14.5 |
| Metal Particles | 13.9 | 6.4-13.9 |
| Mineral Particles | 16.3 | 16.3-21.8 |
| Rubber/Resin Curatives | 1.8 | 1.8-3.7 |
| Corrosion Inhibitor(s) | 0.4 | 0.4-0.9 |
| Total | 99.9 | |

The organic particles requirement may be met by the use of cashew nut shell particles, rubber peels and powdered nitrile rubber particles. The prescribed binders are preferably powdered, straight and/or modified two-step phenolic resin and cashew nut shell resin. Natural and synthetic graphite and coke particles were the carbonaceous constituent. Metal particles include iron powder, ferro phosphorus powder and steel wool particles. For mineral particles we prefer the use of barytes, talc, mica and fiberglass particles.

Figure 6:
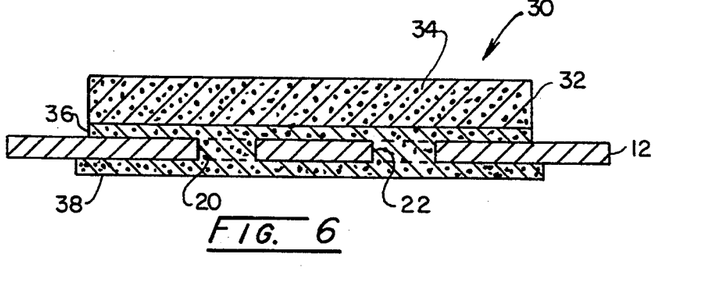
FIG. 6 is a sectioned elevational view similar to FIG. 2 but pertaining to a second embodiment of our brake friction pad assembly invention.
Figure 7:
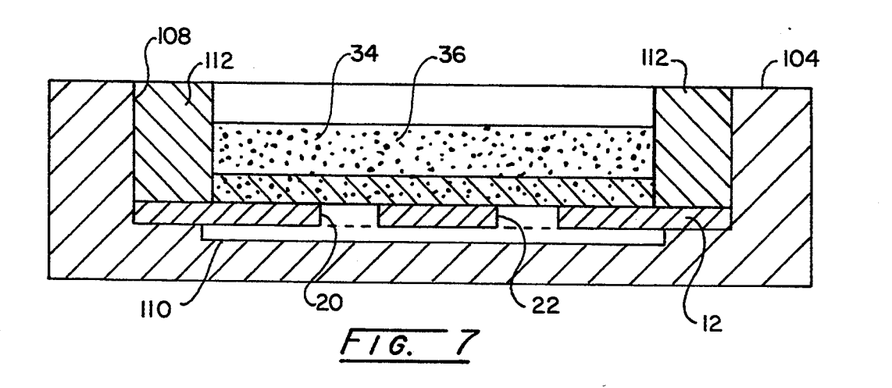
FIG. 7 is a schematic sectioned elevational view of mold apparatus illustrating the material fill condition which exists in the apparatus prior to material molding to produce the brake friction pad assembly illustrated in section in FIG. 6.
Figure 8:
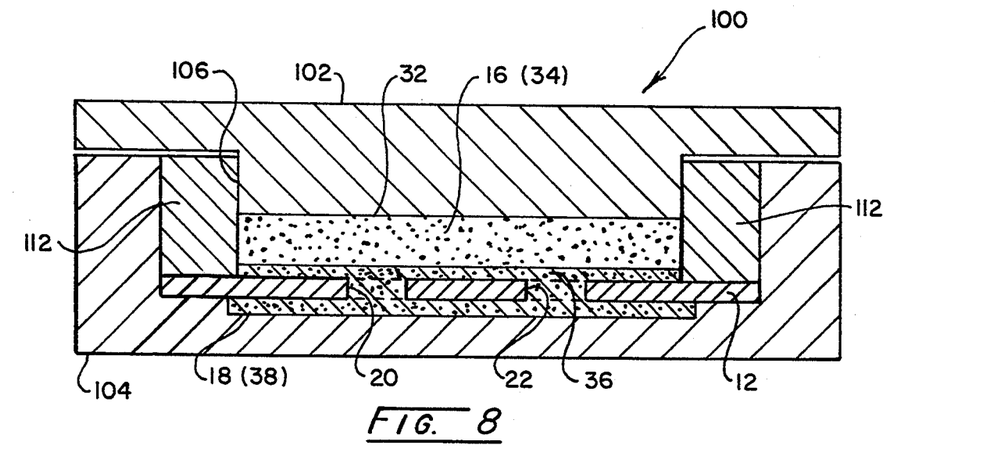
FIG. 8 is a schematic sectioned elevational view of the mold apparatus of FIG. 7 illustrating the material curing condition which exists in the apparatus following mold closure and mold halves compression.

FIGS. 6 through 8 of the drawings illustrate another, and in some respects a preferred, embodiment (30) of the disc brake friction pad assembly of our invention. Assembly (30) has a friction material element (32). The principal difference of assembly (30) over the previously described embodiment (10) (FIGS. 1 through 5) resides in the fact that friction material assembly element (32) is molded of two different material mixture formulations rather than of the single material formulation of element (14). Referring particularly to FIG. 6, the upper part of molded friction material element (32) is comprised of a friction material mixture (34) forming a friction pad element and bonded during curing to a backing material (36). Material (36) differs from material (34) primarily with respect to its viscosity-at-temperature or extrudability property, flowing more readily at the process temperatures employed during material compression and extrusion. Backing material (36) is extruded through openings (20 and 22) in backing plate (12) to form a shim-like noise-damper pad portion (38) in the same manner that molded friction material (14) passes through these openings to form shim-like noise-damper pad portion (18) as described in connection with assembly (10).

For one actual embodiment of assembly (30) we utilized a modified version (Mixture 2) of the friction material particulate mixture formulation detailed in Table 1 above for the molding of friction pad portion (34) and a more extrudable friction-generating material particulate mixture formulation (Mixture 3) as set forth in Table 2 below for forming shim-like noise-damper pad portion (36) of assembly (30). As in the case of Table 1, all ingredients are specified on a percentage volume basis, appropriately rounded.

TABLE 2

| Ingredient | Mixture 2 Formulation | Mixture 3 Formulation |
|---|---|---|
| Organic Particles | 25.7 | 22.3 |
| Binder Particles | 31.4 | 31.8 |
| Carbonaceous Particles | 10.6 | 13.3 |
| Metallic Particles | 21.4 | 10.9 |
| Mineral Particles | 10.9 | 18.5 |
| Rubber/resin Curatives | 0 | 2.6 |
| Corrosion Inhibitor(s) | 0 | 0.6 |
| Total | 100.0 | 100.0 |

An alternate to Mixture 3, designated herein as Mixture 4, was found to be satisfactorily extrudable and was compounded to have 20.9 volume percent Organic Particles, 31.9 volume percent Binder Particles, 14.5 volume percent Carbonaceous Particles, 6.4 volume percent Metallic Particles, 21.8 volume percent Mineral Particles, 3.7 volume percent Rubber resin Curatives, and 0.9 volume percent Corrosion Inhibitors.

It has been found that where Mixture 4 functions solely as an extrudable noise damping composition as opposed to an integral friction/noise damping single element the ranges may be expanded to those described as Mixture 4A hereinbelow. Mixture 4A would not be desirable as an integral friction/noise damping element because of relatively poor friction/wear characteristics. Satisfactory extrusion/noise damping characteristics have been observed for Mixture 4A where the Organic Particles have a range of 5.2 to 23.3 volume percent, the Binder Particles have a range of 30.6 to 39.2 volume percent, the Carbonaceous Particles have a range of 3.6 to 14.5 volume percent, the Metal Particles have a range of 1.6 to 13.9 volume percent, the Mineral Particles have a range of 16.3 to 49.2 percent, the Rubber/resin Curatives have a range of 0.9 to 3.7 volume percent and the Corrosion Inhibitors have a range of 0.2 to 0.9 volume percent.

In the above Mixtures 4 and 4A compositions cashew nut shell particles, rubber peels, nitrile rubber powder and aramid fibers are preferred as the needed organic particles. Cashew nut shell resin, straight and modified two step phenolic resin are preferred as the binder ingredients. Synthetic and flake graphite and coke particles are the carbonaceous ingredients. Ferrophosphorus powder, iron powder, steel wool fibers, and iron oxide were used as the metallic powder constituents and the mineral particles were selected from the group comprised of talc, mica, Rockwool fibers, silica, calcium carbonate, barytes, wollastonite and fiberglass particles.

Also, it should be noted that the manufacture of assembly (30) generally closely follows the processing steps detailed above in connection with disc brake friction pad assembly embodiment (10) including all apparatus and times, but press cure pressure was adjusted to a range of 3000 to 4000 psi and molding temperatures were in the range of 330 to 345 degrees Fahrenheit for the molding material. Mixtures (34 and 36) are introduced into cavity (108) of lower mold half (104) on top of backing plate (12) as conventional pre-compacted forms. Backing material pre-form (36) extrudes through openings (20 and 22) in backing plate (12) to form shim-like noise-damper pad portion (38) in the same manner as the precompacted friction material formulation (14) described in connection with assembly (10) above.

Figure 9:
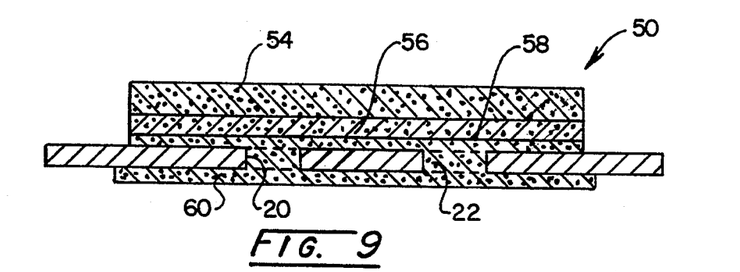
FIG. 9 is a sectioned elevational view similar to FIGS. 2 and 6 but pertaining to a third embodiment of our brake friction pad assembly invention.
Figure 10:
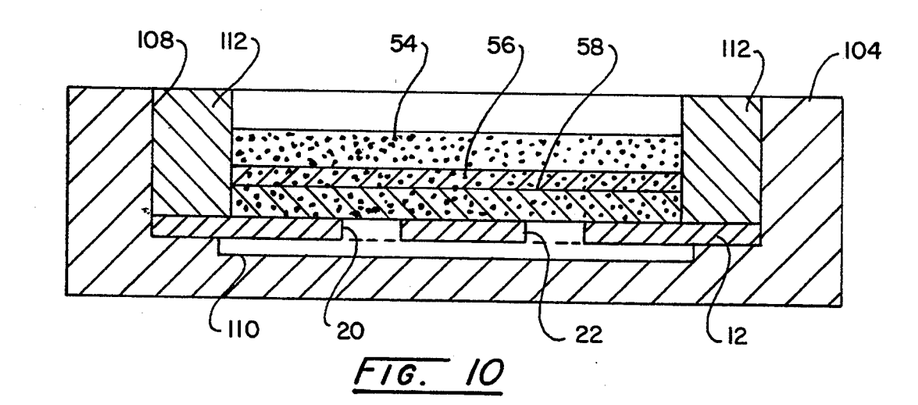
FIG. 10 is a schematic sectioned elevational view of mold apparatus illustrating the material fill condition which exists in the apparatus prior to material molding to produce the brake friction pad assembly illustrated in FIG. 9.
Figure 11:
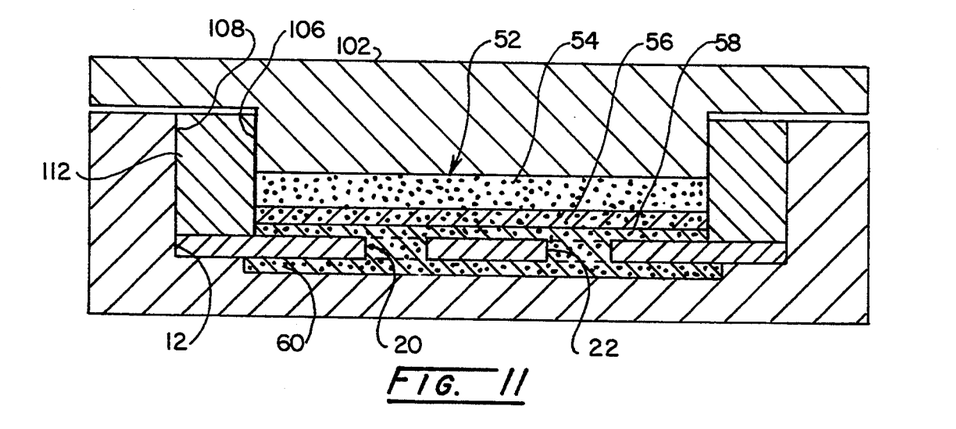
FIG. 11 is a schematic sectioned elevational view of the mold apparatus of FIG. 10 illustrating the material curing condition which exists in the apparatus following mold closure and mold halves compression.

A third embodiment (50) of our disc brake friction pad assembly invention is schematically illustrated in FIGS. 9 through 11 of the drawings. Referring to the schematic sectioned elevational view of FIG. 9 the molded material portion (52) of assembly (50) is comprised of three different integrally bonded segments—54, 56, and 58. The uppermost segment (54) of the molded material element (52) of assembly (50) is the assembly friction-generating component, is cure bonded to segment (56), and is functionally the equivalent of friction pad element (16) of assembly embodiment (10) and friction pad element (34) of assembly embodiment (30). The intermediate segment (56) is a cured backing material having a composition in the mixture formulation range specified by Table 4 below. The material of intermediate backing segment (56), like that of uppermost segments (54), need not have a low viscosity characteristic associated with the processing temperatures that it is subjected to in comparison to the viscosity characteristic (extrudability) developed in lowermost assembly segment (58). Lastly, segment (58) which engages both surfaces of a backing plate (12) and which forms a shim-like noise-damper pad element (60) incorporated into disc brake friction pad assembly (50) must be molded from an extrudable composition.

An actual embodiment of assembly (50) was manufactured of a particulate mixture having the Mixture 5 formulation set forth in Table 3 below for friction pad segment (54), of a particulate mixture having a formulation in the formulation range given in Table 4 below for backing segment (56), and a particulate mixture such as either of above-discussed Mixtures 3, 4, or 4A for integrally-bonded, shim-like, noise-damper pad element (58).

TABLE 3

| Ingredient | Mixture 5 Formulation |
|---|---|
| Organic Particles | 3.8 |
| Binder Particles | 24.1 |
| Carbonaceous Particles | 32.4 |
| Metallic Particles | 31.0 |
| Mineral Particles | 8.6 |
| Rubber/resin Curatives | 0.1 |
| Total | 100.0 |

All proportions in the above Table 3 are given on a volume percentage basis. Suitable organic particles include rubber peel particles, nitrile rubber powder, aramid fiber particles, and cashew nut shell particles. For the binder particles we prefer straight and modified two step phenolic resin particles. For the carbonaceous particles we have used synthetic graphite particles and coke particles. Suitable metallic particles include iron powder, steel wool particles, and iron oxide particles. Satisfactory mineral particles include baryte particles, magnesium oxide particles, rockwool fiber particles, silica flour, calcium carbonate particles, and wollastonite particles. With respect to the particle mixture composition used in connection with the intermediate backing segment (56) of assembly (50) we have used compositions in the formulation range specified in the following Table 4:

TABLE 4

| Ingredient | Mixture Formulation Range |
|---|---|
| Organic Particles | 0–25.7 |
| Binder Particles | 31.4–35.9 |
| Carbonaceous Particles | 0–10.6 |
| Metallic Particles | 16.5–21.4 |
| Mineral Particles | 10.9–47.6 |

For the backing segment material application we prefer that the organic particles be cashew nut shell particles and rubber peel particles. The preferred binder particles are straight and modified two-step phenolic resin particles. Natural graphite particles are preferred as the carbonaceous material. Preferred for the metallic particles category are iron powder, steel wool particles, and iron oxide particles. Lastly, for the mineral particles category we prefer to use either baryte particles, wollastonite particles, or a combination of such ingredients. In Table 4 all proportions are given on a volume percentage basis.

FIGS. 10 and 11 of the drawings illustrate the principal method steps for curing particle mixture compositions 54, 56, and 58. Such materials are preferably compacted into a unitary preformed shape prior to insertion into cavity (108) of lower mold half (104). Other than for this point, all apparatus and all times are generally the same as those employed in connection with the fabrication of disc brake friction pad assembly embodiments (10 and 30) and described in detail above except cure pressure was 3000 psi and cure temperature was in the range of 340 to 350 degrees Fahrenheit followed by post-bake at 340 degrees Fahrenheit.

Although the particulate mixture formulations discussed above in connection with molding friction material elements, noise damping elements and backing material elements have been described as pre-compact forms (pre-forms), all of these elements also may be in the form of loose particles when placed in a mold apparatus. The term particulate mixture formulations is intended to include pre-form and/or loose particle mixtures.

Extensive in-vehicle testing of the foregoing disc brake pad assembly constructions, including the detailed material compositions, by experienced drivers established that a significant reduction in detected audible braking noise was obtained by the practice of our invention in comparison to the noise developed in brake friction pad assemblies not having a noise reducer element integrally incorporated therein. Also, vibration testing and analysis of the different molded compositions using a Fast Fourier Transform (FFT) analyzer, established that the natural frequency of brake assemblies which included the integral composition was decreased and that their damping capability correspondingly increased. The conclusion held true over five different major vibration modes.

An additional benefit of extruding material through openings in a backing plate to create a thin layer of material on the piston side of the plate resides in the fact that the extruded layer has been found to act as a thermal barrier which protects brake components such as phenolic pistons and hydraulic fluid.

Although Figure pairs 4 and 5, 7 and 8, and 10, 11 illustrate positive pressure type apparatus having an upper mold half punch portion (106), other forms of tooling such as flash-type tooling may also be utilized to fabricate disc brake friction pad assemblies in accordance with our invention. For instance, adequate compression pressures may be developed using a heated flat upper platen member instead of an upper mold half with integral punch portion. In that instance, the uppermost friction material placed in the apparatus must be in a pre-compact form and must initially project above the uppermost surface of a mold plate with a cutout corresponding to the assembly friction pad portion planform. Such mold plate must have a thickness that is significantly less than the thickness of mold insert (112) by a prescribed amount. Also, the mold plate with cutout would rest upon a base plate having the equivalent of sub-cavity (110) and mold cavity portion (108) would not be required. With the illustrated positive pressure tooling, however, the friction material need not be in pre-compact form when placed in the mold for compression.

Other material compositions, component shapes, and component sizes within the scope of the claims which follow may be utilized in the practice of this invention. Also, as noted previously this invention applies equally to disc brake friction pad assemblies and drum brake friction pad or article assemblies.

Since certain changes may be made in the above-described system and apparatus not departing from the scope of the invention herein and above, it is intended that all matter contained in the description or shown in the accompanying drawings shall be interpreted as illustrative and not in a limiting sense.

We claim our invention as follows:

1. A brake friction pad assembly comprising:
   a backing plate means having opposed faces and at least one extrusion opening extending between said opposed faces;
   a molded friction-generating pad element in contact with one of said backing plate means opposed faces; and
   a molded noise-damping pad element which overlies and contacts a substantial portion of the other of said backing plate means opposed faces, said noise-damping pad element being joined to said friction-generating pad element by molded material contained within said extrusion opening.

2. The brake friction pad assembly defined by claim 1 wherein said molded friction-generating pad element and said molded noise-damping pad element are molded of the same composition.

3. The brake friction pad assembly defined by claim 2 wherein said same friction-generating pad element and said noise-damping pad element are molded of a composition comprised of approximately from 20.9 to 23.3 parts organic particles, approximately from 31.7 to 31.9 parts binder particles, approximately from 12.5 to 14.5 parts carbonaceous particles, approximately from 6.4 to 13.9 parts metallic particles, approximately from 16.3 to 21.8 parts mineral particles, approximately from 1.8 to 3.7 parts organic particle/binder particle curatives, and approximately from 0.4 to 0.9 parts corrosion inhibitor(s), all said parts proportions being on a percentage volume basis.

4. A brake friction pad assembly defined by claim 1 wherein said molded friction-generating pad element is molded of a first composition and said molded noise-damping pad element is molded of a second composition, said first composition having a primary friction-generating property and a higher cure viscosity property than the corresponding properties of said second composition.

5. The brake friction pad assembly defined by claim 4 wherein said first composition is comprised of approximately 25.7 parts organic particles, approximately 31.4 parts binder particles, approximately 10.6 parts carbonaceous particles, approximately 21.4 parts metallic particles, and approximately 10.9 parts mineral particles all said parts proportions being on a percentage volume basis.

6. The brake friction pad assembly defined by claim 4 wherein said second composition is comprised of approximately from 20.9 to 23.3 parts organic particles, approximately from 31.7 to 31.9 parts binder particles, approximately from 12.5 to 14.5 carbonaceous particles, approximately from 6.4 to 13.9 parts metallic particles, approximately from 16.3 to 21.8 parts mineral particles, approximately from 1.8 to 3.7 parts rubber particle/resin particles curatives and approximately from 0.4 to 0.9 parts corrosion inhibitor(s), all said parts proportions being on a percentage volume basis.

7. The brake friction pad assembly defined by claim 4 wherein said second composition is comprised of approximately from 5.2 to 23.3 parts organic particles approximately from 30.6 to 39.2 parts binder particles approximately from 3.6 to 14.5 parts carbonaceous particles approximately from 1.6 to 13.9 parts metallic particles approximately from 16.3 to 49.2 parts mineral particles, approximately from 0.9 to 3.7 parts rubber/resin particles curatives and approximately 0.2 to 0.9 parts corrosion inhibitors, all said parts proportions being on a percentage volume basis.

8. The brake friction pad assembly defined by claim 1 and further comprised of a molded backing pad element situated intermediate and said molded friction-generating pad element and said molded noise-damping pad element and functioning to integrally join said noise-damping pad to said friction-generating pad, said molded backing pad element being molded of a composition having a reduced thermal conductivity property in comparison to the corresponding properties of the composition from which said friction-generating pad element is molded.

9. The brake friction pad assembly defined by claim 8 wherein said molded backing material element composition is comprised of approximately from 0 to 25.7 parts organic particles, approximately from 31.4 to 35.9 parts binder particles, approximately from 0 to 10.6 parts carbonaceous particles, approximately from 16.5 to 21.4 metallic particles, and approximately from 10.9 to 47.6 parts mineral particles, all said parts proportions being on a percentage volume basis.

10. The brake friction pad assembly defined by claim 9 wherein said molded friction-generating pad element composition is comprised of approximately 3.8 parts organic particles, approximately 24.1 parts binder particles, approximately 32.4 parts carbonaceous particles, approximately 31.0 parts metallic particles, approximately 8.6 parts mineral particles, and approximately 0.1 parts organic particles curatives, all said parts proportions being on a percentage volume basis.

11. The brake friction pad assembly defined by claim 9 wherein said molded noise-damping pad element composition is comprised of approximately from 20.9 to 23.3 parts organic particles, approximately from 31.7 to 31.9 parts binder particles, approximately from 12.5 to 14.5 parts carbonaceous particles, approximately from 6.4 to 13.9 parts metallic particles, approximately from 16.3 to 21.8 parts mineral particles, approximately from 1.8 to 3.7 parts organic particles/binder particles curatives, and approximately from 0.4 to 0.9 parts corrosion inhibitor(s), all said parts proportions being on a percentage volume basis.

12. A thermally curable molding composition mixture comprised of: approximately from 20.9 to 23.3 parts organic particles, approximately from 31.7 to 31.9 parts binder particles, approximately from 12.5 to 14.5 parts carbonaceous particles, approximately from 6.4 to 13.9 parts metallic particles, approximately from 16.3 to 21.8 parts mineral particles, approximately from 1.8 to 3.7 parts organic particles/binder particles curatives and approximately from 0.4 to 0.9 parts corrosion inhibitor(s), all said parts proportions being on a percentage volume basis.

13. A thermally curable molding composition mixture comprised of: approximately 25.7 parts organic particles, approximately 31.4 parts binder particles, approximately 10.6 parts carbonaceous particles, approximately 21.4 parts metallic particles, and approximately 10.9 parts mineral particles, all said parts proportions being on a percentage volume basis.

14. In a method of forming a brake friction pad assembly by compression molding a friction material in separable mold halves which have an interior mold cavity the steps of:
placing a backing plate element having spaced-apart upper and and lower faces and at least one extrusion opening extending between said faces in the mold interior cavity in a position above a lower pad portion of the mold interior cavity which overlies a substantial portion of said backing plate element and below an upper pad portion of the mold interior cavity;
placing a measured quantity of a friction-generating composition particulate mixture in the mold interior cavity on said backing plate element upper face; and
closing the separable mold halves a sufficient distance to compress said friction-generating composition particulate mixture and extrude a portion of said mixture through said backing plate element extrusion opening to thereby fill said mold interior cavity upper and lower pad portions with said friction-generating composition particulate mixture contacting both said backing plate element spaced-apart upper and lower faces.

15. The method defined by claim 14 herein said friction-generating composition particulate mixture is comprised of approximately from 20.9 to 23.3 parts organic particles, approximately from 31.7 to 31.9 parts binder particles, approximately from 12.5 to 14.5 parts carbonaceous particles, approximately from 6.4 to 13.9 parts metallic particles, approximately from 16.3 to 21.8 parts mineral particles, approximately from 1.8 to 3.7 parts organic particles/binder particles curatives, and approximately from 0.4 to 0.9 parts corrosion inhibitor(s), all said parts proportions being on a percentage volume basis.

16. The method defined by claim 15 wherein said friction-generating composition particulate mixture is compacted into a solid shape prior to being placed in the mold interior cavity upon said backing plate element upper face and over said backing plate element extrusion opening.

17. In a method of forming a brake friction pad assembly having distinct and separate friction-generating and noise-damping pad elements carried by a backing plate element by compression in a mold having separable halves with an included interior mold cavity, the steps of:
placing a backing plate element having spaced-apart upper and lower faces and at least one extrusion opening extending between said faces in said mold interior cavity in a position above a noise-damper pad cavity portion and below a friction-generating pad cavity portion;
placing a measured quantity of a noise-damping composition particulate mixture in said mold interior cavity on said backing plate element upper face over said extrusion opening;
placing a measured quantity of a friction-generating composition particulate mixture in said mold interior cavity on said noise-damping composition particulate mixture; and
closing the separable mold halves a sufficient distance to compress said friction-generating and noise-damping composition particulate mixtures and extrude at least a portion of said noise-damping composition particulate mixture through said backing plate element extrusion opening to fill said mold cavity noise-damper pad cavity portion with said noise-damping composition particulate mixture and said mold cavity friction-generating pad cavity portion with said friction-generation composition particulate mixture and with a portion of said noise-damping composition particulate mixture.

18. The method defined by claim 17 wherein said noise-damping composition particulate mixture is comprised of: approximately from 20.9 to 23.3 parts organic particles, approximately from 31.7 to 31.9 parts binder particles, approximately from 12.5 to 14.5 parts carbonaceous particles, approximately from 6.4 to 13.9 parts metallic particles, approximately from 16.3 to 21.8 parts mineral particles, approximately from 1.8 to 3.7 parts rubber particles, particles curatives, and approximately from 0.4 to 0.9 parts corrosion inhibitor(s), all said parts proportions being on a percentage volume basis.

19. The method defined by claim 17 wherein said noise damping particulate mixture is comprised of approximately from 5.2 to 23.3 parts organic particles approximately from 30.6 to 39.2 parts binder particles approximately from 3.6 to 14.5 parts carbonaceous particles, approximately from 1.6 to 13.9 parts metallic particles, approximately from 16.3 to 49.2 parts mineral particles, approximately from 0.9 to 3.7 parts rubber/resin particles curatives, and approximately 0.2 to 0.9 parts corrosion inhibitors, all said parts proportions being on a percentage volume basis.

20. The method defined by claim 17 wherein said friction-generating composition particulate mixture is comprised of: approximately 25.7 parts organic particles approximately 31.4 parts binder particles, approximately 10.6 parts carbonaceous particles, approximately 21.4 parts metallic particles, and approximately 10.9 parts mineral particles all said parts proportions being on a percentage volume basis.

21. In a method of forming a brake friction pad assembly having distinct and separate friction-generating and noise-damping pad elements with an intermediately positioned distinct and separate backing pad element by the compression of molding compositions in a mold having separable halves with an included interior mold cavity, the steps of:

placing a backing plate element having spaced-apart upper lower faces and at least one extrusion opening extending between said faces into said mold interior cavity in a position above a noise-damper pad element cavity position which overlies a substantial portion of said backing plate element and below a friction-generating pad element cavity portion;

placing a measured quantity of a noise-damping composition particulate mixture in said mold interior cavity on said backing plate element upper face;

placing a measured quantity of a backing composition particulate mixture in said mold interior cavity on said noise-damping composition particulate mixture.

placing a measured quantity of a friction-generating composition particulate mixture in said mold interior cavity on said backing composition particulate mixture; and closing the separable mold halves a sufficient distance to compress said friction-generating backing and noise-damping composition particulate mixtures and extrude at least a portion of said noise-damping composition particulate mixture through said backing plate element extrusion opening to fill said mold interior cavity noise-damper pad element portion with said noise-damping composition particulate mixture and said mold interior cavity friction-generating pad element portion with said friction-generating composition particulate mixture, said backing composition particulate mixture, and a portion of said noise-damping composition particulate mixture.

22. The method defined by claim 21 wherein said noise-damping composition particulate mixture is comprised of: approximately from 20.9 to 23.3 parts organic particles, approximately from 31.7 to 31.9 parts binder particles, approximately from 12.5 to 14.5 parts carbonaceous particles, approximately from 6.4 to 13.9 metallic particles approximately from 16.3 to 21.8 parts mineral particles, approximately from 1.8 to 3.7 parts organic particles binder particles curatives, and approximately from 0.4 to 0.9 parts corrosion inhibitor(s), all said parts proportions being on a percentage volume basis.

23. The method defined by claim 21 wherein said noise-damping composition particulate mixture is comprised of approximately from 5.2 to 23.3 parts organic particles, approximately from 30.6 to 39.2 parts binder particles, approximately from 3.6 to 14.5 parts carbonaceous particles, approximately from 1.6 to 13.9 parts metallic particles, approximately from 16.3 to 49.2 parts mineral particles, approximately from 0.9 to 3.7 parts rubber/resin particles curatives, and approximately 0.2 to 0.9 parts corrosion inhibitors, all said parts proportions being on a percentage volume basis.

24. The method defined by claim 21 wherein said friction-generating composition particulate mixture is comprised of: approximately 25.7 parts organic particles, approximately 31.4 parts binder particles, approximately 10.6 parts carbonaceous particles, approximately 21.4 parts metallic particles, and approximately 10.9 parts mineral particles, all said parts proportions being on a percentage volume basis.

25. The method defined by claim 21 wherein said backing composition particulate mixture is comprised of: approximately from 0 to 25.7 parts organic particles, approximately from 31.4 to 35.9 parts binder particles, approximately from 0 to 10.6 parts carbonaceous particles, approximately from 16.5 to 21.4 parts metallic particles, and approximately from 10.9 to 47.6 parts mineral particles, all said parts proportions being on a percentage volume basis.

* * * * *